United States Patent [19]

Debbaut et al.

[11] Patent Number: 4,686,327
[45] Date of Patent: Aug. 11, 1987

[54] PROTECTION OF CABLE SPLICE

[75] Inventors: Christian A. M. Debbaut, Cary; Gerald L. Shimirak, Raleigh, both of N.C.; John C. Swinmurn, Mountain View, Calif.

[73] Assignee: Raychem Corporation, Menlo Park, Calif.

[21] Appl. No.: 751,762

[22] Filed: Jul. 1, 1985

Related U.S. Application Data

[63] Continuation-in-part of Ser. No. 652,359, Sep. 18, 1984, abandoned.

[51] Int. Cl.[4] .................. H02G 15/08; H01R 43/033
[52] U.S. Cl. .................................... 174/88 R; 156/48; 156/49; 156/53; 156/56; 174/23 R; 174/76; 174/DIG. 8
[58] Field of Search ............... 174/88 R, 76, 92, 23 R, 174/DIG. 8; 156/48, 49, 53, 56

[56] References Cited

U.S. PATENT DOCUMENTS

| | | |
|---|---|---|
| 3,339,011 | 8/1967 | Ewers, Jr. et al. ............ 174/92 |
| 3,361,605 | 1/1968 | Gilbert ........................ 264/262 X |
| 3,518,359 | 6/1970 | Trimble et al. ........ 174/DIG. 8 X |
| 3,652,777 | 3/1972 | Elliott ........................ 174/23 R X |
| 3,895,180 | 7/1975 | Plummer ...................... 174/92 |
| 3,992,569 | 11/1976 | Hankins et al. ................ 174/92 |
| 4,135,587 | 1/1979 | Diaz .............................. 174/92 |
| 4,209,352 | 6/1980 | Diaz et al. .................. 174/92 X |
| 4,421,945 | 12/1983 | Moisson ........................ 174/92 |
| 4,466,843 | 8/1984 | Shimirak ...................... 174/76 X |
| 4,466,846 | 8/1984 | Nolf et al. ............... 174/DIG. 8 X |
| 4,468,536 | 8/1984 | Van Noten .................... 174/92 |
| 4,511,415 | 4/1985 | Dienes ........................ 174/92 X |
| 4,518,448 | 5/1985 | Henry et al. ................ 174/92 X |

OTHER PUBLICATIONS

Fukutomi et al., "Prefabricated Pressure Dam for Telephone Cable", Proceedings of 20th International Wire & Cable Symposium, 1971.
Pirelli General "Resinwrap Joints" Brochure, Mar. 1964.
Pirelli General Cable Works Ltd "Jointing Instructions for 'Resinwrap' Breeches Joint", Aug. 1973.

*Primary Examiner*—Morris H. Nimmo
*Attorney, Agent, or Firm*—T. Gene Dillahunty; Ira D. Blecker

[57] ABSTRACT

A splice between two multiconductor cables is protected from ingress of water by a closure which contains a pressure means such as a bladder inside the closure capable of pressurizing a sealant present inside the closure to a pressure sufficient to force the sealant into the interstices of the splice and the interstices between the conductors in the cable, and maintaining the pressure until the sealant cures or hardens. The pressure means may also interact with seals at the end of the closure to seal the closure to the cable jacket.

3 Claims, 1 Drawing Figure

PROTECTION OF CABLE SPLICE

RELATED APPLICATIONS

This is a continuation-in-part application of U.S. patent application Ser. No. 652,359 filed Sept. 18, 1984 (now abandoned).

BACKGROUND OF THE INVENTION

This invention relates to protecting a splice of multiconductor electrical cables from the ingress of water. Of particular interest are communication cables, such as telephone cables.

The multiconductor communications cables usually comprise a core containing a plurality of individually insulated wire conductors surrounded by an outer sheath. The cable core may contain a few pairs of conductors up to several hundreds or even thousands of pairs of conductors. The outer sheath of the cable usually is a plastic jacket surrounding a metal shield. Additional inner polymeric layers may be present. The cables are usually referred to as "filled" cables because the cable is usually filled with a filling compound such as a grease or petroleum jelly which helps prevent the ingress of water into the cable.

When two or more of the cables are spliced together, the jacket and other layers of the cable are removed near the end of the cable to expose the individual insulated conductors which are then individually connected to the conductors from the other cable or cables. After completion of the splice the entire splice area must be protected from ingress of water. Various devices and methods have been used for protection of such splices such as U.S. Pat. No. 3,361,605 to Gilbert, U.S. Pat. No. 3,895,180 to Plummer, and U.S. Pat. No. 3,992,569 to Hankins et al. Plummer and Hankins are typical examples of methods and apparatus used to protect cable splices of the type referred to above and are sometimes referred to as "buried splice closures." These types of cables are commonly used underground and the splices must be protected to prevent ingress of water when they are buried underground.

Use of inflatable means in cable protection is illustrated in U.S. Pat. Nos. 4,209,352 to Diaz et al., 3,652,777 to Elliott and 3,339,011 to Ewers et al.

It is generally recognized that one of the paths through which water may enter the splice area and damage the individual spliced conductors by corrosion or short circuit is by migration through the interior of one or more of the cables spliced. Since such water migration occurs in the "filled" cables, it is necessary to provide splice protection method and apparatus to prevent water from entering the splice area from any path, including through the interior core of the cable. U.S. Pat. No. 4,466,843 to Shimirak recognized the importance of applying pressure to the liquid sealant while the liquid sealant cures to form a water impenetrable seal.

The liquid sealants used to protect splices of the type referred to herein are generally curable liquid polymer systems which comprise a pre-polymer and a curing agent or hardener which can be mixed together and poured into the splice enclosure and allowed to cure. Particularly useful curable liquid sealants are the two-part polyurethane systems. The sealants normally used solidify to a gel-like consistency, i.e., the solid cured sealant has considerable elasticity to allow the sealant to conform to changes in size or shape of the splice area due to expansion or extraction or other mechanical forces acting on the splice area. These sealants are also usually reenterable. In addition, solid sealants may be used in some applications as disclosed in copending application Ser. No. 740,134 filed May 30, 1985.

SUMMARY OF THE INVENTION

This invention provides apparatus and methods for encapsulation and protection of a splice of multiconductor electric cable from the ingress of water which are simple in construction and operation. In addition, the effectiveness of the splice protection provided by this invention is not significantly affected by installer skill.

This invention provides an assembly for protecting a splice connecting at least two multiconductor electric cables from ingress of water which comprises:

An assembly for protecting a splice connecting at least two multi conductor electrical cables from ingress of water comprising:

(a) a closure for enclosing the splice area having end portions for sealing to the cable jacket and having sufficient strength to contain an expanding pressure means;

(b) heat recoverable sealing means capable of the end portions of the closure to the cable jacket; and (c) an expanding pressure means positioned between the splice and the closure and being capable of exerting sufficient pressure on a reservoir of liquid sealant positioned around the splice to force the liquid sealant to penetrate into the splice and the interstices between the conductors in the cable, of exerting pressure on the heat recoverable sealing means and of being activated and controlled from outside the closure.

The invention further provides a method for protecting a splice connecting at least two multiconductor electrical cables from ingress of water which comprises:

A method for protecting a splice connecting at least two multiconductor electrical cables from ingress of water which comprises:

(a) forming a reservoir around the splice area, sealing the reservoir to the cable jackets, filling the reservoir with sufficient liquid sealant to encapsulate the splice and closing the reservoir;

(b) positioning end portions of a closure and sealing the end portions to the cable jacket with a heat recoverable sealing means;

(c) positioning a closure and an expandable pressure means around the splice area and said end portions;

(d) pressurizing the pressure means to a pressure sufficient to force the liquid sealant to penetrate into said splice and into the interstices between the conductor in the cables and to cause the pressure means to exert pressure on the said heat recoverable sealing means; and (e) maintaining said pressure in the enclosed area for a period of time to permit the liquid sealant to harden.

The closure useful in the invention as described above may be any conventional closure for cable splices, which is capable of maintaining its structural integrity under the pressures generated. An example of such closures which may be readily adapted for use in the apparatus and method of this invention is shown in U.S. Pat. No. 4,421,945 to Moisson. It is generally preferred that the closure be a wraparound type closure, although a sleeve closure is equally effective, but is generally limited to new installations and is not practical in reentry situations.

The closures useful in this invention should have an end portion such as an end plate which has an opening approximating the size of the cable and a shoulder or lip on said opening which can be engaged by a heat recoverable sealing means to seal the end plate or end portion of the closure to the cable jacket. This sealing is accomplished by using a heat recoverable sealing means which can be wraparound or tubular in form and which preferably contains a hot melt adhesive coating which will aid in sealing the end portion of the closure means to the cable jacket.

The pressure means inside the enclosed area may be any pressure means which will exert the required pressure on the liquid sealant inside the closure and which can be activated and controlled from outside the closure. A preferred pressure means is a bladder which is connected through a valve to the outside of the closure. The bladder can be an elastic or rubber bladder which can be inflated through the valve communicating outside the closure. Other pressure means may be used, such as an expandable foam which expands in response to heat, whereby the heat can be applied to the outside of the closure heating the expandable foam causing it to pressurize the sealant contained within the closure. Alternatively, the heat-expandable foam may have an internal electric heater which may be powered from outside the closure. From the description contained herein, numerous other means will be obvious to one skilled in the art.

The sealants useful in this invention are those sealants which are liquid for some period of time to enable the filling of the closure and the application of the necessary pressure to effect the desired sealing and penetration of the splice, connectors and interstices between the conductors in the cables. Then the sealant should harden by chemical curing or other phenomenon to form a solid. In addition to conventional curing sealants, a noncurable sealant may be used, for example a molten liquid wax which will solidify at normal service temperatures. In the solid form the sealant is preferably somewhat elastic so it will conform to any slight changes in shape of the closure, the splice or the cables through, for example, expansion and contraction by temperature change. Conventional sealants are well known in the art and discussed in the background patents referred herein, which are incorporated herein by reference. The preferred sealants for use in this invention are the conventional two-package urethane sealants, which cure to a gel-like solid which is easily reenterable.

DETAILED DESCRIPTION OF THE INVENTION

Figure 1:
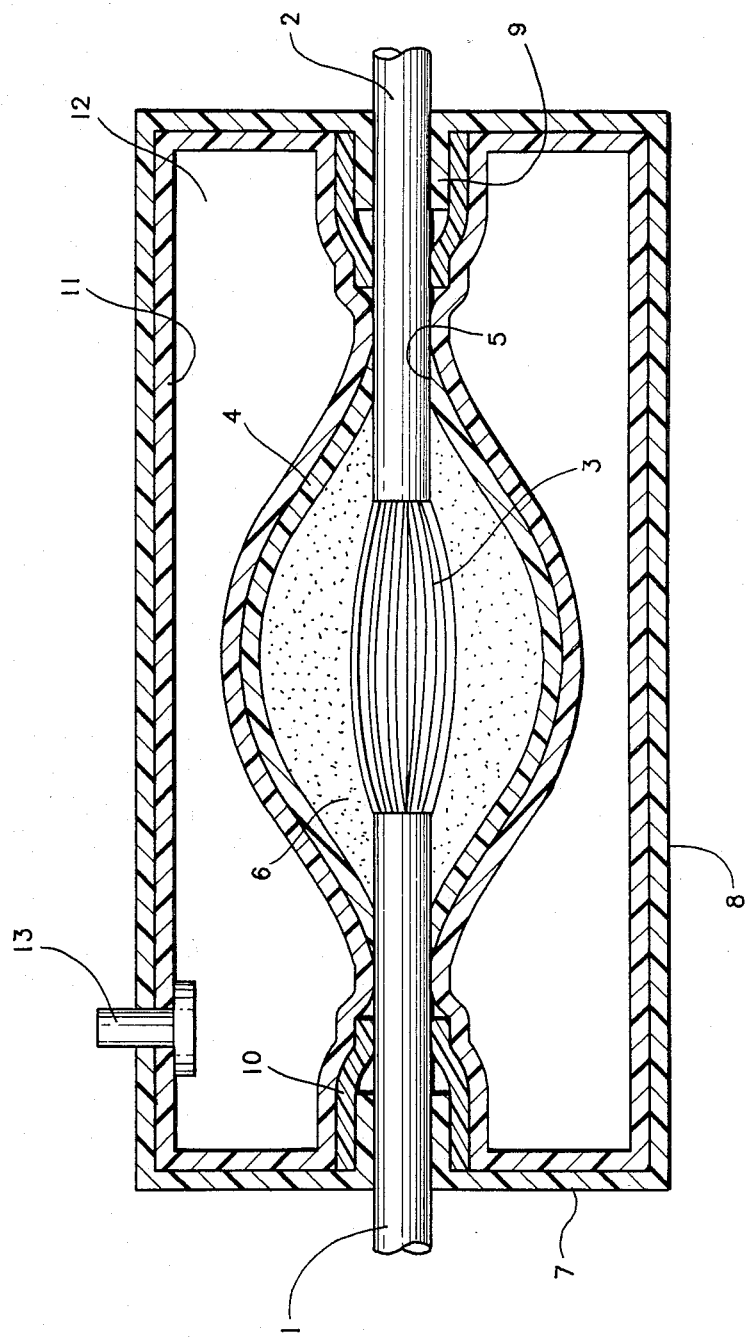
FIG. 1 illustrates a cable splice closure containing a pressure means in accordance with this invention.

Reference to FIG. 1 illustrates an example of the apparatus and method of this invention. Cables 1 and 2 are connected in splice area 3. This splice area is enclosed by a flexible reservoir 4 which is sealed to the cable jacket in area 5 and contains a liquid, curable sealant in area 6 and portions 7 of closure 8 contain a shoulder area of 9. Heat recoverable sleeve 10 is placed on shoulder 9 and on the cable jacket and recovered in position to seal the end portion 7 of the closure to the cable jacket. Heat recoverable sleeve 10 preferably contains a coating of hot melt adhesive to aid in the sealing of end portion 7 of the closure to the cable jacket. The main body of the closure 8 contains inflatable bladder 11 with means 13 communicating from the interior of the bladder 12 to the outside of closure means 8 and providing means to inflate the bladder from outside the closure. Inflation of bladder 11 exerts the required pressure on reservoir 4 and sealant 6 to effect the desired seal in the splice area and bladder 11 exerts pressure on heat recoverable sealing means 10 to assure that a sufficient seal is maintained between end portion of the closure 7 and cable jackets 1 and 2.

We claim:

1. A splice assembly connecting at least two multiconductor electrical cables from ingress of water comprising:
    (a) a splice connecting at least two multi-conductor electrical cables, which have a jacket thereon adjacent the splices;
    (b) a closure enclosing and surrounding the splice area having end portions sealed to the cable jackets and having sufficient strength to contain an expanding pressure means;
    (c) heat recoverable sealing means sealing the end portions of the closure to the cable jacket; and
    (d) an expanding pressure means positioned between the splice and the closure and being capable of exerting sufficient pressure on a reservoir of liquid sealant positioned around the splice to force the liquid sealant to penetrate into the splice and the interstices between the conductors in the cables, of exerting pressure on the heat recoverable sealing means and of being activated and of being controlled from outside the closure.

2. An assembly according to claim 1, wherein the pressure means is a flexible bladder which can be pressurized with a fluid from outside the closure.

3. A method for protecting a splice connecting at least two multiconductor electrical cables from ingress of water which comprises:
    (a) forming a reservoir around the splice area, sealing the reservoir to the cable jackets, filling the reservoir with sufficient liquid sealant to encapsulate the splice and closing the reservoir;
    (b) positioning end portions of a closure and sealing the end portions to the cable jacket with a heat recoverable sealing means;
    (c) positioning a closure and an expandable pressure means around the reservoir and said end portion of the closure, wherein the expandable pressure means is positioned between the reservoir and the enclosure;
    (d) pressurizing the pressure means to a pressure sufficient to force the liquid sealant to penetrate into said splice and into the interstices between the conductors in the cables and to cause the pressure means to exert pressure on the said heat recoverable sealing means; and
    (e) maintaining said pressure in the enclosed area for a period of time to permit the liquid sealant to harden.

* * * * *